(12) United States Patent
Nagata et al.

(10) Patent No.: US 10,146,977 B2
(45) Date of Patent: Dec. 4, 2018

(54) OPTICAL INFORMATION READING DEVICE

(71) Applicant: Keyence Corporation, Osaka (JP)

(72) Inventors: Hidezumi Nagata, Osaka (JP); Taichi Tajika, Osaka (JP); Yusuke Otsubo, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/895,445

(22) Filed: Feb. 13, 2018

(65) Prior Publication Data

US 2018/0225491 A1    Aug. 9, 2018

Related U.S. Application Data

(63) Continuation of application No. 15/367,209, filed on Dec. 2, 2016, now Pat. No. 9,946,910, which is a
(Continued)

(30) Foreign Application Priority Data

Jul. 31, 2014   (JP) .................................. 2014-157029

(51) Int. Cl.
*G06K 7/10*       (2006.01)
*G06K 7/14*       (2006.01)
*G02B 1/08*       (2006.01)

(52) U.S. Cl.
CPC ............. *G06K 7/1417* (2013.01); *G02B 1/08* (2013.01); *G06K 7/10544* (2013.01);
(Continued)

(58) Field of Classification Search
CPC ........... G06K 7/10732; G06K 7/10544; G06K 7/10574; G06K 7/10702; G06K 7/10742;
(Continued)

(56) References Cited

U.S. PATENT DOCUMENTS

| 4,697,890 A | 10/1987 | Crookston |
| 4,760,248 A | 7/1988 | Swartz et al. |

(Continued)

FOREIGN PATENT DOCUMENTS

| JP | 07-282175 | 10/1995 |
| JP | 10-187873 | 7/1998 |
| JP | 2011-076519 | 4/2011 |

*Primary Examiner* — Daniel Walsh
(74) *Attorney, Agent, or Firm* — Kilyk & Bowersox, P.L.L.C.

(57) ABSTRACT

Provided is an optical information reading device that can reduce an installation load on a user, and can accurately read a code provided to each of various workpieces. A polarized illumination light source includes light emitters that irradiate the workpiece with illumination light through a polarization filter. A non-polarized illumination light source includes light emitters that irradiate the workpiece with illumination light without through a polarization filter. An imaging element is provided with a polarization filter having a polarization direction different from a polarization direction of the polarization filter of the light emitters. Either of the polarized illumination light source and the non-polarized illumination light source is used in accordance with the workpiece.

9 Claims, 11 Drawing Sheets

Related U.S. Application Data continuation of application No. 14/794,867, filed on Jul. 9, 2015, now Pat. No. 9,542,583.

(52) U.S. Cl.
CPC ..... G06K 7/10574 (2013.01); G06K 7/10702 (2013.01); G06K 7/10722 (2013.01); G06K 7/10732 (2013.01); G06K 7/10742 (2013.01); G06K 7/10821 (2013.01); G06K 7/10831 (2013.01)

(58) Field of Classification Search
CPC ............. G06K 7/10831; G06K 7/1417; G06K 7/10722; G06K 7/10821; G02B 1/08
See application file for complete search history.

(56) References Cited

U.S. PATENT DOCUMENTS

| | | | |
|---|---|---|---|
| 4,864,618 A | 9/1989 | Wright et al. | |
| 4,955,693 A | 9/1990 | Bobba | |
| 4,958,291 A | 9/1990 | Mamone et al. | |
| 5,010,241 A * | 4/1991 | Butterworth | G06K 7/10594 235/454 |
| 5,111,030 A | 5/1992 | Brasington et al. | |
| 5,149,948 A | 9/1992 | Chisholm | |
| 5,177,346 A | 1/1993 | Chisholm | |
| 5,541,419 A * | 7/1996 | Arackellian | G02B 27/28 235/470 |
| 5,717,596 A | 2/1998 | Bernard et al. | |
| 5,894,348 A * | 4/1999 | Bacchi | G06K 7/10722 235/455 |
| 5,992,744 A * | 11/1999 | Smith | G06K 7/10574 235/462.07 |
| 6,060,722 A * | 5/2000 | Havens | G06K 7/10732 235/462.2 |
| 6,105,869 A * | 8/2000 | Scharf | G06K 7/10742 235/454 |
| 6,426,838 B1 * | 7/2002 | Rudeen | G02B 27/283 359/485.03 |
| 6,567,794 B1 | 5/2003 | Cordery et al. | |
| 6,637,888 B1 | 10/2003 | Haven | |
| 6,819,409 B1 | 11/2004 | Tompkin et al. | |
| 8,201,217 B1 | 6/2012 | Begen et al. | |
| 8,600,196 B2 * | 12/2013 | King | G06Q 30/00 358/474 |
| 8,775,331 B1 | 7/2014 | Tsuie et al. | |
| 8,985,463 B2 | 3/2015 | Decoux et al. | |
| 9,542,583 B2 | 1/2017 | Nagata et al. | |
| 9,754,146 B2 * | 9/2017 | Izaki | G06K 7/10831 |
| 9,946,910 B2 * | 4/2018 | Nagata | G06K 7/1417 |
| 2001/0011944 A1 | 8/2001 | Garrido-Gadea et al. | |
| 2001/0032881 A1 | 10/2001 | Wells et al. | |
| 2002/0071076 A1 | 6/2002 | Webb et al. | |
| 2002/0077847 A1 * | 6/2002 | Thiel | G06Q 10/08 705/39 |
| 2002/0125411 A1 * | 9/2002 | Christy | G06K 7/10683 250/225 |
| 2003/0024989 A1 | 2/2003 | Aizawa | |
| 2003/0055794 A1 | 3/2003 | Johnson et al. | |
| 2003/0074333 A1 | 4/2003 | Foth et al. | |
| 2004/0096911 A1 * | 5/2004 | Siniaguine | G01N 21/21 435/7.1 |
| 2004/0119943 A1 | 6/2004 | Rathjen | |
| 2004/0144845 A1 | 7/2004 | Bidault et al. | |
| 2004/0254893 A1 | 12/2004 | Tsuei et al. | |
| 2004/0260615 A1 | 12/2004 | Phillips et al. | |
| 2005/0065892 A1 | 3/2005 | Ryan, Jr. et al. | |
| 2005/0071244 A1 | 3/2005 | Phillips et al. | |
| 2005/0119786 A1 | 6/2005 | Kadaba | |
| 2005/0237487 A1 * | 10/2005 | Chang | G03B 35/16 353/7 |
| 2005/0278263 A1 | 12/2005 | Hollander et al. | |
| 2006/0015469 A1 | 1/2006 | Whitehouse | |
| 2006/0124741 A1 * | 6/2006 | Mayer | G07D 7/002 235/454 |
| 2006/0197934 A1 * | 9/2006 | Yamazoe | G03F 7/70125 355/71 |
| 2007/0090280 A1 * | 4/2007 | Harding | G01B 11/2509 250/225 |
| 2007/0092160 A1 * | 4/2007 | Fujii | A61B 5/0059 382/286 |
| 2008/0110977 A1 | 5/2008 | Bonalle et al. | |
| 2008/0142597 A1 | 6/2008 | Joseph et al. | |
| 2010/0219251 A1 * | 9/2010 | Decoux | G07D 7/12 235/470 |
| 2010/0235267 A1 | 9/2010 | Brookner et al. | |
| 2010/0265505 A1 | 10/2010 | Gribkov | |
| 2011/0010289 A1 | 1/2011 | Kranzley | |
| 2011/0042591 A1 * | 2/2011 | Kurose | G06K 7/12 250/566 |
| 2011/0147459 A1 | 6/2011 | Goren et al. | |
| 2011/0163162 A1 * | 7/2011 | Coutant | G06K 7/10732 235/455 |
| 2011/0166994 A1 | 7/2011 | Ross et al. | |
| 2012/0104101 A1 | 5/2012 | Handshaw et al. | |
| 2013/0241143 A1 | 9/2013 | Nireki | |
| 2014/0210998 A1 * | 7/2014 | Pawlik | G07D 7/12 348/135 |
| 2015/0048166 A1 | 2/2015 | Lei et al. | |
| 2015/0115032 A1 | 4/2015 | Chi | |
| 2015/0278569 A1 | 10/2015 | Zolotov | |
| 2016/0012269 A1 | 1/2016 | Kowalczyk et al. | |
| 2016/0026007 A1 | 1/2016 | Rinella | |
| 2016/0034734 A1 * | 2/2016 | Nagata | G06K 7/10732 235/455 |
| 2017/0083733 A1 * | 3/2017 | Nagata | G06K 7/10732 |
| 2017/0262674 A1 * | 9/2017 | Pinter | G06K 7/1413 |
| 2018/0129845 A1 * | 5/2018 | Negro | G06K 7/10722 |

* cited by examiner

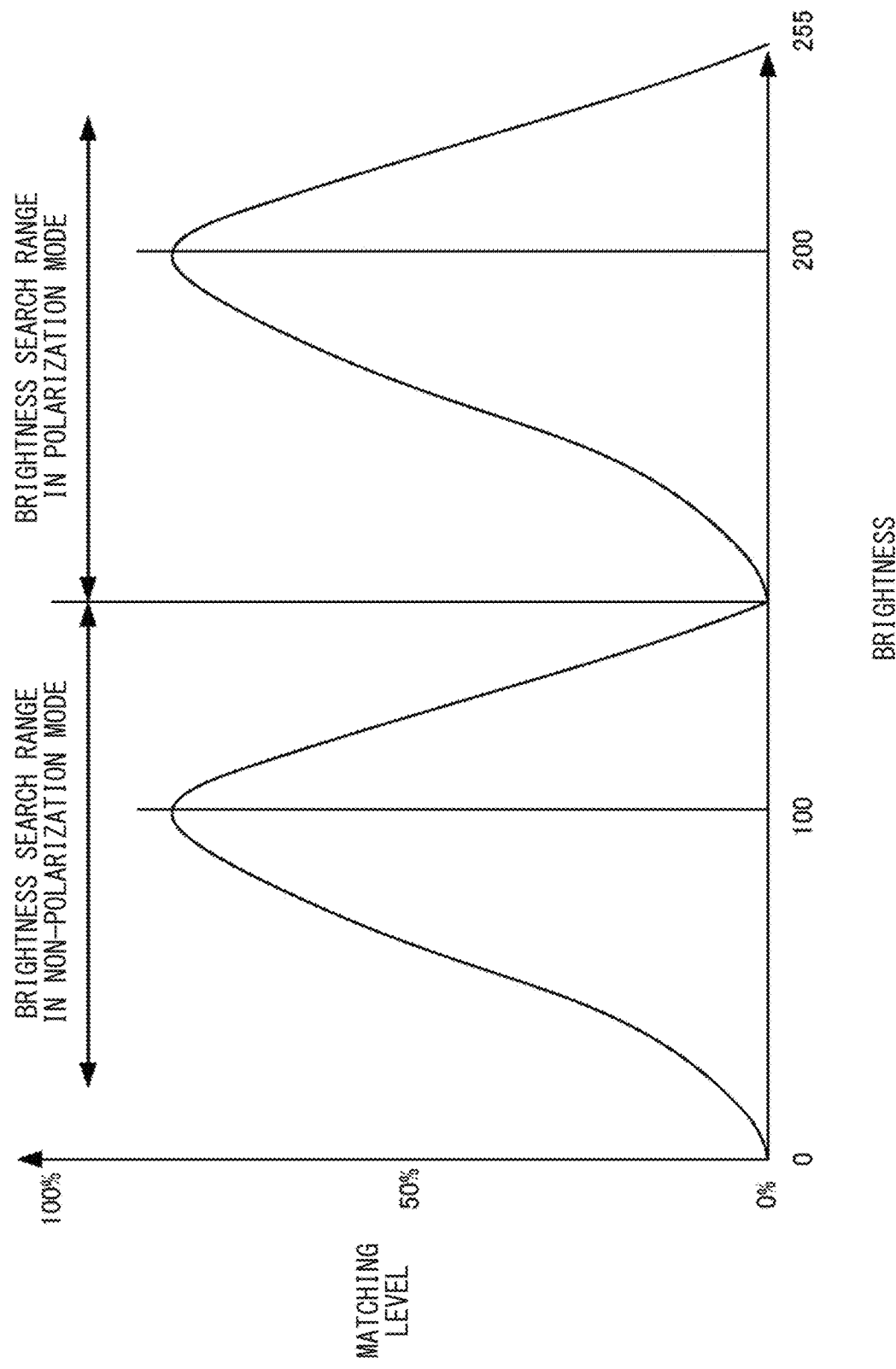

OPTICAL INFORMATION READING DEVICE

CROSS-REFERENCE TO RELATED APPLICATIONS

The present application is a continuation of U.S. patent application Ser. No. 15/367,209, filed Dec. 2, 2016 which in turn is a continuation of U.S. patent application Ser. No. 14/794,867, filed Jul. 9, 2015, now U.S. Pat. No. 9,542,583, which claims foreign priority based on Japanese Patent Application No. 2014-157029, filed Jul. 31, 2014, the contents of which are incorporated herein by reference.

BACKGROUND OF THE INVENTION

1. Field of the Invention

The present invention relates to a fixed optical information reading device of optical information reading devices that optically read information.

2. Description of Related Art

There are a handy-type optical information reading device that reads a code in a state where an operator holds the device in his or her hand, and a fixed optical information reading device that is fixed and reads information by moving an object with a code attached. A two-dimensional code reader (hereinafter, referred to as a reader) that reads a two-dimensional code such as a barcode, and a QR code (registered trademark) has been widely spread. One example of the above-described reader is described in JP 2011-76519 A. In JP 2011-76519 A and JP H7-282175 A, provision of a polarization filter in each of an illumination optical system and an imaging optical system is described. Patent Literature 3: JP H10-287873 A When a reader is downsized, an optical axis of an imaging element and an optical axis of an illumination system cannot but be made parallel to each other. This is because a distance between the optical axis of the imaging element and the optical axis of the illumination system cannot but be shortened. In the above-described reader, illumination light reflects at a surface of a workpiece (an inspection object product), and regular reflected light enters the imaging element, which makes it hard to read a two-dimensional code. Consequently, the reader needs to be installed with an optical axis of the reader inclined to a normal line of the surface of the workpiece so that the normal line and the optical axis do not coincide with each other. This is referred to as oblique attachment. The attachment of the reader in which the normal line of the surface of the workpiece and the optical axis of the reader are parallel is referred to as front attachment. If the surface of the workpiece is almost planar, inclining the optical axis to the normal line only by a recommended angle enables the two-dimensional code to be read accurately.

In recent years, the two-dimensional code has been printed on a surface (a casting surface) of a casting such as an engine block by laser marking or the like (so-called direct part marking (DPM)). Since as known well, minute irregularities exist on the surface of the casting, the front attachment brings about higher reading accuracy than the oblique attachment. Moreover, since the two-dimensional code is printed in various parts such as a surface (milled surface) of a workpiece subjected to milling, black resin, and a substrate, a proper reading method differs in the respective parts. Thus, a user needs to search for an installation angle suitable for each workpiece.

Moreover, in the oblique attachment, an image obtained by reading the two-dimensional code is distorted, which may cause a reading error. Thus, the front attachment makes it unnecessary to search for the installation angle, thereby reducing an installation load on the user. Moreover, the front attachment has an advantage that the image is not distorted.

As described in JP 2011-76519 A and JP H7-282175 A, the provision of the polarization filters can reduce influence of the regular reflected light even in the front attachment. However, the provision of the polarization filters disables the reader from reading a code provided by the direct part marking on the casting surface. While it can be considered to make the polarization filters detachable, labor for detachment newly occurs.

SUMMARY OF THE INVENTION

In this manner, reduction in the installation load on the user has been requested from the market, regarding the above-described reader that reads various workpieces. Consequently, an object of the present invention is to provide an optical information reading device that can reduce an installation load on a user, and can accurately read a code provided to each of various workpieces.

According to the present invention, there is provided an optical information reading device, for example, including:
a first illumination section that illuminates a workpiece and irradiates the workpiece with illumination light through a polarization filter;
a second illumination section that illuminates the workpiece and irradiates the workpiece with illumination light without through a polarization filter;
an imaging section provided with a polarization filter having a polarization direction different from a polarization direction of the polarization filter of the first illumination section, the imaging section for receiving light through the polarization filter having the polarization direction different from the polarization direction of the polarization filter of the first illumination section to capture an image of a code provided in the workpiece, the light being light from the workpiece irradiated by at least one of the first illumination section and the second illumination section; and
a decoding section that decodes image data acquired by the imaging section.

According to the present invention, provided is an optical information reading device that can reduce an installation load on a user, and can accurately read a code provided to each of various workpieces.

BRIEF DESCRIPTION OF THE DRAWINGS

FIG. 11 is a diagram showing one example of a search range of the brightness level with respect to each illumination mode.

DETAILED DESCRIPTION OF PREFERRED EMBODIMENTS

In the following, an embodiment of the present invention will be described. The individual embodiments described in the following will be useful for understanding various concepts such as a superordinate concept, a medium concept, a subordinate concept and the like of the present invention. Moreover, the technical scope of the present invention is defined by the claims, and is not limited by the following individual embodiments.

Figure 1:
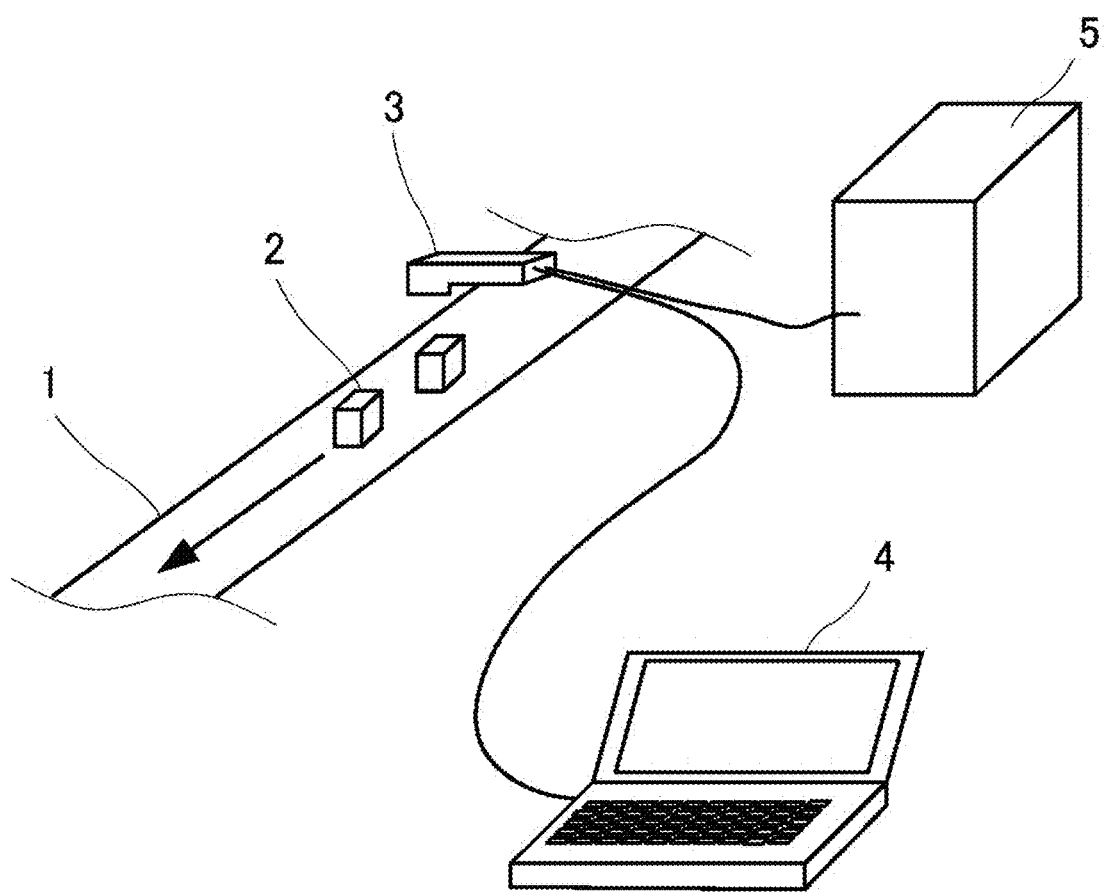
FIG. 1 is a diagram showing an optical information reading device.

FIG. 1 is a diagram showing one example of a reader system (an optical information reading device). A line 1 is a conveyance belt or the like that conveys a workpiece 2 which is an inspection object. A reader 3 is a two-dimensional code reader that reads and decodes a two-dimensional code. The reader 3 itself is also an optical information reading device in a narrow sense. A programmable logic controller (PLC 5) is a control device that controls the line 1 and the reader 3. A computer 4 is an information processing device that sets an operating condition and the like for the reader 3, and obtains a decoding result from the reader 3 to display the same.

<Structure of Reader 3>

Figure 2A:
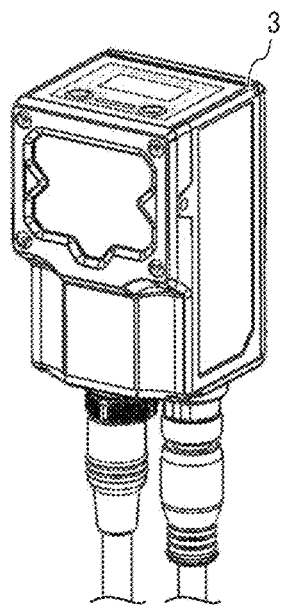
FIGS. 2A and 2B are diagrams showing a structure of the optical information reading device.
Figure 2B:
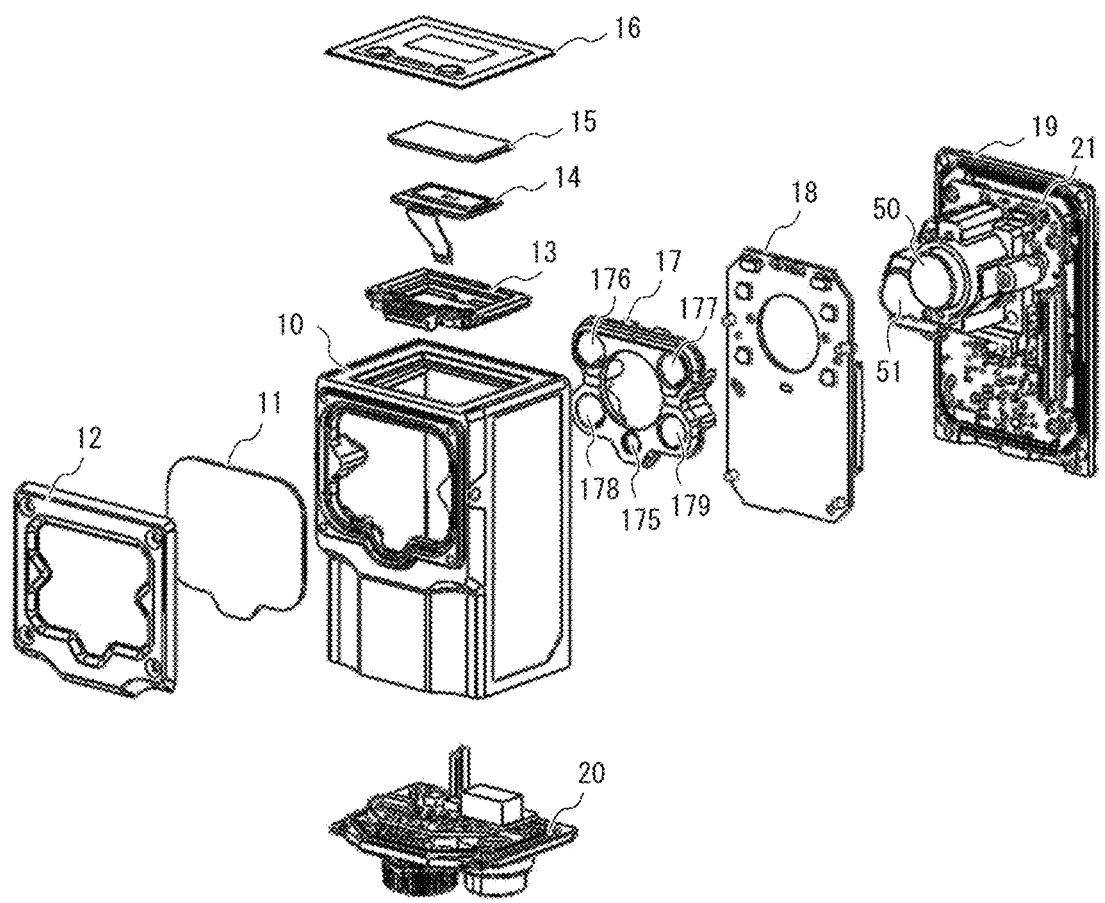

FIG. 2A is a perspective diagram of the reader 3, and FIG. 2B is an exploded diagram of essential parts. Since the shape of the reader 3 is substantially rectangular parallelepiped, outer surfaces of the housing roughly consist of six surfaces. As shown in FIG. 2B, four openings are provided in a front case 10. In the opening on an upper surface side, a holder 13, an image display device 14 supported by the holder 13, a display panel 15 arranged so as to cover the image display device 14, and a main sheet 16 are provided. In the opening on a front surface side of the front case 10, a window portion 11 having translucency and a front cover 12 are provided. In particular, in the present embodiment, a polarization filter is provided in a part of the window portion 11. A reflector 17 and an illumination substrate 18 are inserted from the opening on a back surface side of the front case 10, and a rear case 19 is put like a lid. In the rear case 19, a main substrate 21, and an optical system 50 and an AF mechanism 51 fixed to the main substrate 21 are provided. The reflector 17 is a structural part to efficiently irradiate a front side with light from light emitters provided in the illumination substrate 18. In the reflector 17, there are provided cone (truncated cone) type light condensing portions 176 to 179 to condense the light from the light emitters for illumination on the front side and irradiate the front side, and a cone type light condensing portion 175 to condense light from the light emitter for a pointer on the front side to irradiate the front side. These are gold-plated, for example, in order to increase light condensation efficiency. A connector holder 20 is attached to the opening on a lower surface side of the front case 10. Two communication cables are connected to the connector holder 20, and are connected to the computer 4 and the PLC 5, respectively. A connector substrate is attached to the connector holder 20.

Figure 3A:
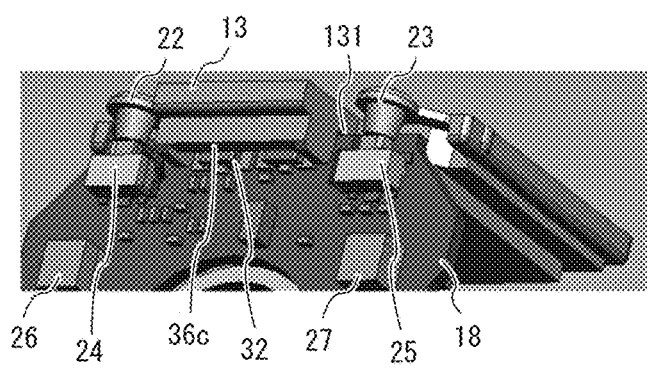
FIGS. 3A to 3C are diagrams showing a support structure of an image display device.
Figure 3B:
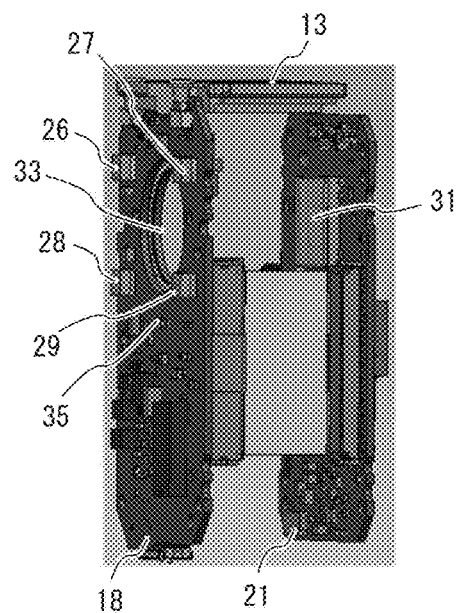
Figure 3C:
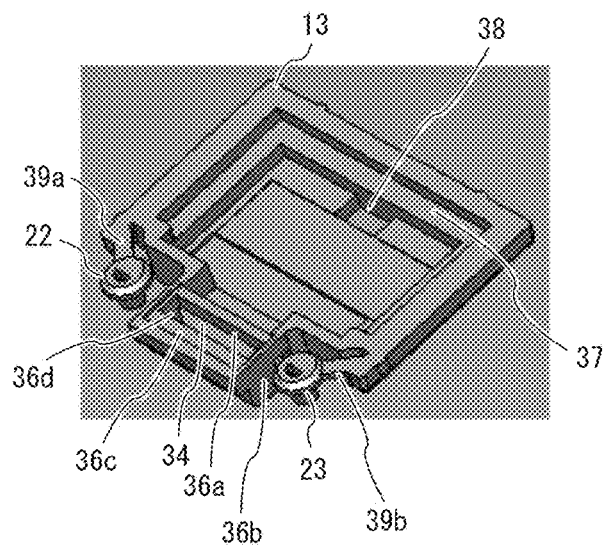

FIGS. 3A to 3C are diagrams for describing a structure around the holder 13. As shown in FIGS. 3A and 3B, the holder 13 is a support member that supports the image display device 14. The illumination substrate 18 extends in a direction perpendicular to the holder 13 and is engaged with the holder 13 to support the holder 13. That is, the holder 13 is provided parallel to an upper surface of the front case 10, and the illumination substrate 18 is provided parallel to a front surface of the front case 10, so that both are perpendicular to each other. A groove 131 is provided on a lower surface side of the holder 13, and an end portion of the illumination substrate 18 may be fitted in the groove 131 to thereby firmly fix the holder 13 to the illumination substrate 18. Employing the above-described holder 13 can make a circuit board for attaching the image display device 14 unnecessary.

As shown in FIGS. 3A and 3C, in the illumination substrate 18, there may be arranged push-button type switches 24, 25 in each of which a pressing surface exists on the same side as a display surface side of the image display device 14. A constitution may be such that the switches 24, 25 are pressed by pressing members 22, 23 constituted integrally with the holder 13, respectively, so that respective contacts are closed. Since a pressing direction of the switches 24, 25 and a length direction of the illumination substrate 18 supporting the holder 13 are coincident with each other, the holder 13 is hard to be warped even when the switches 24, 25 are pressed. The pressing member 22 is supported by an elastic arm portion 39a extending from a main constituent of the holder 13. Similarly, the pressing member 23 is supported by an elastic arm portion 39b extending from the main constituent of the holder 13. The pressing members 22, 23 pressed down return to original positions by elasticity of the arm portions 39a, 39b. Since the arm portions 39a, 39b are constituted integrally with the holder 13, there is an advantage that additional members for returning such as springs can be omitted.

As shown in FIGS. 3A and 3B, the illumination substrate 18 is provided with a circular opening portion 33 to mount an optical system module (the optical system 50, the AF mechanism 51 and the like) provided corresponding to an imaging element 31. Four light emitters 26 to 29 for illumination are provided around the opening portion 33. As shown in FIG. 3A, one or a plurality of light emitters 32 functioning as an indicator are provided in the vicinity of an engagement portion between the illumination substrate 18 and the holder 13. An opening portion 34 for guiding light is provided in the holder 13 so that light from the light emitters 32 is outputted outside from the upper surface of the front case 10. That is, the indicator is arranged between the two switches 24, 25. As shown in FIG. 3C, four sides of the opening portion 34 are surrounded by light-shielding walls 36a to 36d, which makes the light of the indicator hard to leak to the image display device 14. The holder 13 is provided with a container groove 37 to contain the image display device 14. A hole portion 38 to pass a signal cable of the image display device 14 is provided in a bottom portion of the container groove 37.

As shown in FIG. 3B, the imaging element 31 is arranged in the main substrate 21. As shown in FIG. 3B, in the illumination substrate 18, a light emitter 35 that outputs light for the pointer is arranged. As described above, in the reflector 17, in addition to the light condensing portion 175 for the light emitter 35, the light condensing portions 176 to 179 for light emitters 26 to 29 are provided. The light condensing portions 175 to 179 each have a cone shape, so that the light comes in from an opening on a top side of the cone and goes out from a bottom surface side.

Figure 4:
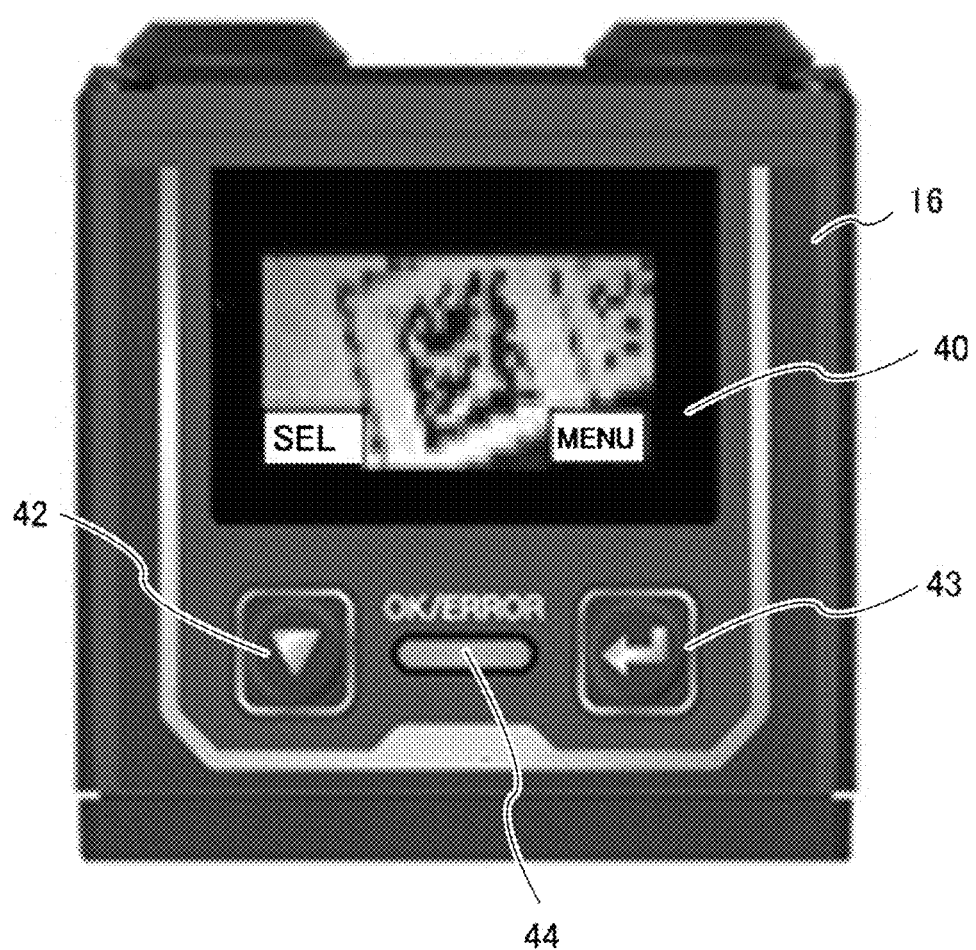
FIG. 4 is a diagram showing display and an operation panel of the optical information reading device.

FIG. 4 is a diagram showing the main sheet 16. A display surface 40 of the image display device 14 is provided in a central portion of the main sheet 16. A select key 42, an indicator 44, and an enter key 43 are provided in a lower portion of the main sheet 16. The select key 42 is made up of the above-described switch 24 and pressing member 22. The enter key 43 is made up of the above-described switch 25 and pressing member 23. The indicator 44 is made up of the two light emitters 32, and for example, when reading of the two-dimensional code succeeds, the green light emitter lights, and when the reading of the two-dimensional code fails, the red light emitter lights. The image display device 14 may display an image (SEL and MENU (however, it may be displayed as ENT) in FIG. 4) that shows the user assignments of the select key 42 and the enter key 43 in addition to an image (a still image or a moving image) acquired by the imaging element 31.

<Control Unit>

Figure 5:
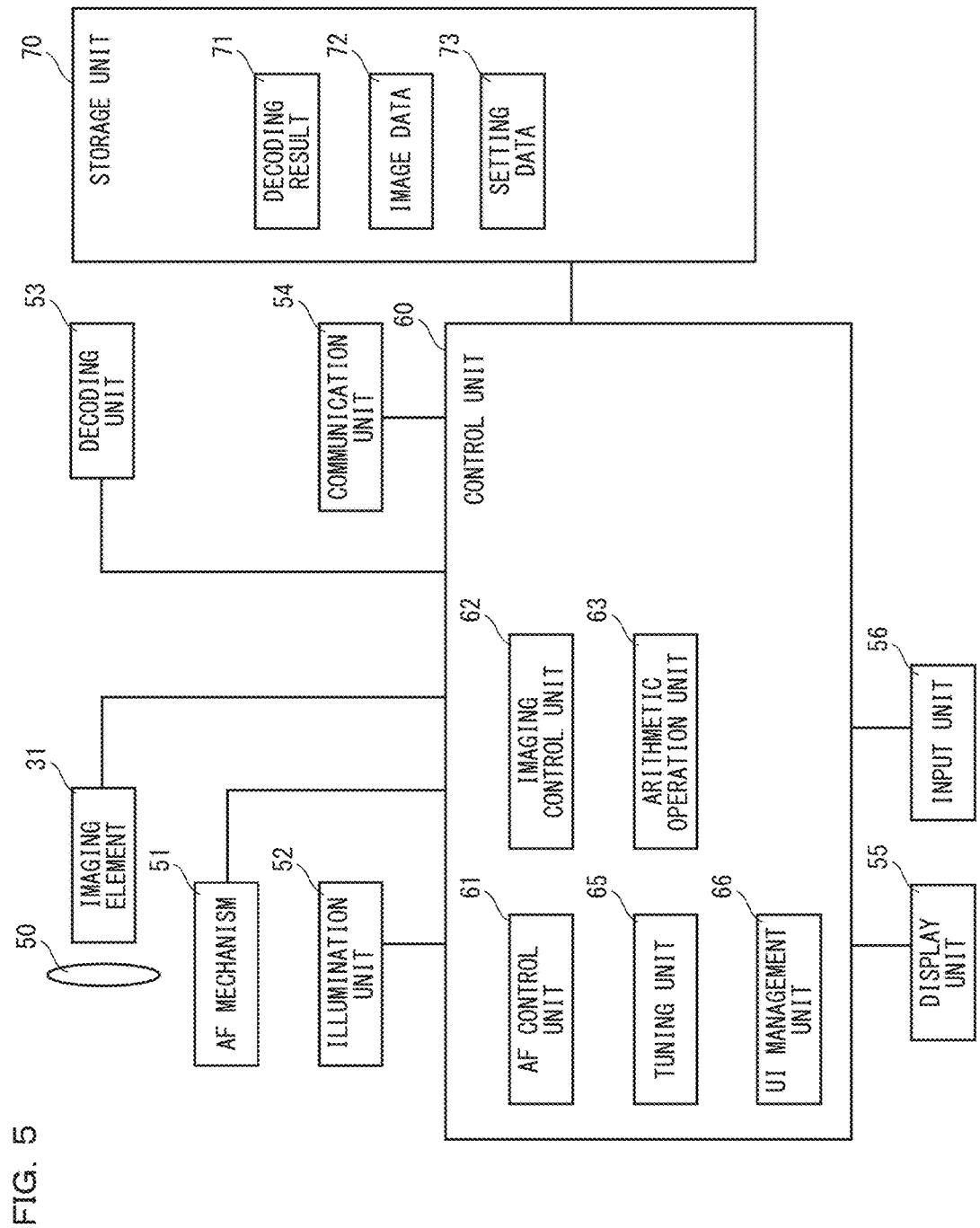
FIG. 5 is a diagram showing an electronic configuration of the optical information reading device.

FIG. 5 is a block diagram showing an electronic configuration of the reader 3. A camera unit (imaging section) of the reader 3 has the imaging element 31, the optical system 50, the AF mechanism 51, an illumination unit 52 and the like. The imaging element 31 is an image sensor such as a CCD and a CMOS that converts an image of the two-dimensional code formed through the optical system 50 to an electrical signal. The AF mechanism 51 is a mechanism that adjusts a position and a refractive index of a lens for focusing in the optical system 50. The AF mechanism 51 and the optical system 50 are arranged between the imaging element 31 and the opening portion 33 in FIG. 3B. The AF mechanism 51 and the optical system 50 may be integrated to make up the optical system module.

The illumination unit 52 is a unit that has one or more light emitters to illuminate the two-dimensional code. The illumination unit 52 has, for example, the light emitters 26 to 29 for illumination, and the light emitter 35 for the pointer. The light of the pointer is a criterion for an optical axis of the optical system 50, and the user may place the workpiece 2 at a proper position with reference to a position of the pointer.

A decoding unit 53 is a unit that decodes image data 72 of the two-dimensional code acquired by the imaging element 31 to write a decoding result 71 in a storage unit 70. A communication unit 54 is a unit that communicates with the PLC 5 and the computer 4. The communication unit 54 may include, for example, an I/O unit that communicates with the PLC 5, a serial communication unit such as an RS232C, a network communication unit such as a wireless LAN and wired LAN and so on.

A display unit 55 includes the image display device 14 and the light emitters 32 for indicator. The display unit 55 may display, for example, a character string, which is the decoding result 71 of the two-dimensional code, a reading success rate (an average reading success rate when reading processing is executed a plurality of times), a matching level (a reading margin indicating easiness of the reading), PPC (pixel per cell: a value indicating how many pixels one of cells making up the two-dimensional code is equivalent to in the image data), and the like. An input unit 56 is a unit that accepts an input operation of each of the switches or the like, and includes the select key 42 and the enter key 43.

A control unit 60 is a unit that comprehensively controls the respective units of the reader 3. The control unit 60 has various functions, and these may be implemented by a logical circuit, or by executing software. An autofocus control unit (AF control unit) 61 is a unit that controls the AF mechanism 51. An imaging control unit 62 is a unit that controls the amount of illumination light of the illumination unit 52, and an exposure time (shutter speed) of the imaging element 31. In particular, the imaging control unit 62 functions as a lighting control section that controls which of the plurality of light emitters of the illumination unit 52 is to be lighted in accordance with an instruction from a tuning unit 65 or an arithmetic operation unit 63.

The arithmetic operation unit 63 executes various types of arithmetic operation processing. For example, the arithmetic operation unit 63 arithmetically operates the reading success rate, the matching level, and the PPC, using the decoding result, the image data and the like. Obviously, these arithmetic operations may be executed in a unit other than the arithmetic operation unit 63, such as the decoding unit 53 and the tuning unit 65.

The tuning unit 65 functions as a reading condition control section that controls a reading condition or a condition decision section that decides an illumination condition. The reading condition is, for example an imaging condition such as the exposure time, the amount of illumination light, and a gain, and an image processing condition (a coefficient of a filter and the like) in the decoding unit 53. The proper imaging condition and image processing condition are changed by influence of natural light on the workpiece 2 conveyed on the line 1, or the like. The tuning unit 65 thus searches for a more proper reading condition to set the AF control unit 61, the imaging control unit 62, and the decoding unit 53.

A UI management unit 66 is a unit that displays the image data on the image display device 14, accepts a user instruction from the input unit 56, and controls the lighting of the indicator.

The storage unit 70 is a storage device such as a memory, and stores the decoding result 71 acquired by the decoding unit 53, the image data 72 acquired by the imaging element 31, and setting data 73 which is data set for reader 3 by a setting device such as the computer 4, and data set by the input unit 56 and so on.

Figure 6:
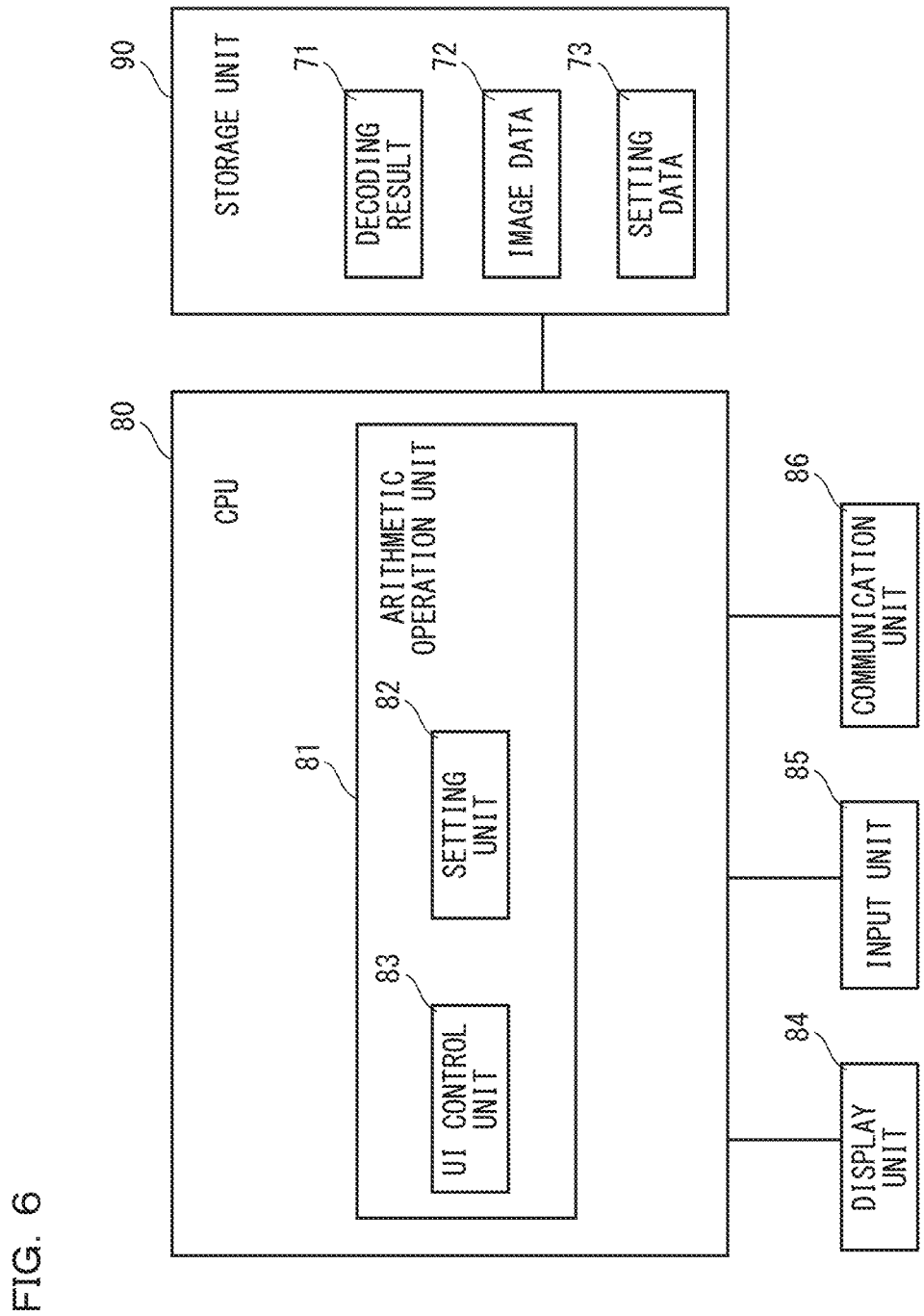
FIG. 6 is a diagram showing a computer connected to the optical information reading device.

FIG. 6 is a block diagram showing functions of the computer 4. Downsizing of the reader 3 makes it difficult to set all the functions of the reader 3 only by the display unit 55 and the input unit 56 of the reader 3. Consequently, a part of the setting data 73 may be created in the computer 4 to be transferred to the reader 3. A CPU 80 is a unit that controls respective units included by the computer 4, based on a program stored in a storage unit 90. A UI control unit 83, which is one function of an arithmetic operation unit 81, generates a user interface to set the imaging condition (in particular, whether or not the light emitters with the polarization filter attached are to be used) and the like of the reader 3, and a user interface to display the decoding result 71, the image data 72 and the like outputted by the reader 3 to cause a display unit 84 to display the user interfaces. The arithmetic operation unit 81 is a unit that executes various arithmetic operations. A communication unit 86 connects to the communication unit 54 of the reader 3 by wired or wireless connection to receive the decoding result 71 and the image data 72, and transmits the setting data 73 generated in a setting unit 82. The storage unit 90 is a memory, a hard disk drive (HDD), a solid state drive (SSD) or the like.

<Illumination Modes (Polarization Mode and Non-Polarization Mode)>

In the present embodiment, in order to reduce an installation load on the user, and accurately read a code provided to each of various workpieces, a plurality of illumination sections are provided, and in a first illumination section, a polarization filter is arranged, and in a second illumination section, no polarization filter is arranged. The first illumination section and the second illumination section are used properly in accordance with each of the workpieces. This allows the user to save labor for adjusting an installation angle of the reader 3 for each of the workpieces.

As described above, when the front attachment with respect to the workpiece 2 is applied to the reader 3, a large amount of regular reflected light from the workpiece 2 easily enters the imaging element 31. This is likely to occur in the case where a surface on the workpiece 2 where the two-dimensional code is provided is a smooth surface, and causes failure of the decoding of the two-dimensional code. In order to cut the regular reflected light, it can be considered that polarization filters having different polarization directions are arranged in the imaging element 31 and the illumination unit 52. However, if the whole illumination unit 52 is covered with the polarization filter, the two-dimensional code provided on a surface of a casting by direct part marking cannot be read accurately. That is, reading accuracy of the two-dimensional code printed on the casting surface is higher when the polarization filter is not provided in the illumination unit 52. In this manner, whether to provide the polarization filter depends on a surface of the workpiece 2 and a method for providing the two-dimensional code. Moreover, when the polarization filter is provided, the amount of light attenuates to ½ at the polarization filter on a light emission side, and the amount of light further attenuates to ½ at the polarization filter on a light reception side. That is, the amount of light attenuates to ¼ in total. As the amount of light attenuates, the reading of the two-dimensional code fails more easily. If in order to compensate for an attenuation amount, the amount of light emission of the light emitters is increased, not only power consumption is increased, but heat is increased. These can be disadvantageous.

As a method for handling the various workpieces 2 with one reader 3, employing a detachable type polarization filter that covers emission areas of all the light emitters corresponding to the workpiece 2 can be considered. In this case, however, the user needs to determine whether the polarization filter is to be provided or removed by himself or herself, and needs to perform the attachment and the detachment of the polarization filter by hand. That is, while adjustment of the installation angle is not required for the user, instead, installation/detachment work of the polarization filter is required.

Consequently, in the present embodiment, proposed is the reader 3 in which the first illumination section provided with the polarization filter, and the second illumination section not provided with the polarization filter are provided, and these illumination sections are used by switching in accordance with each of the workpieces 2.

Figure 7B:
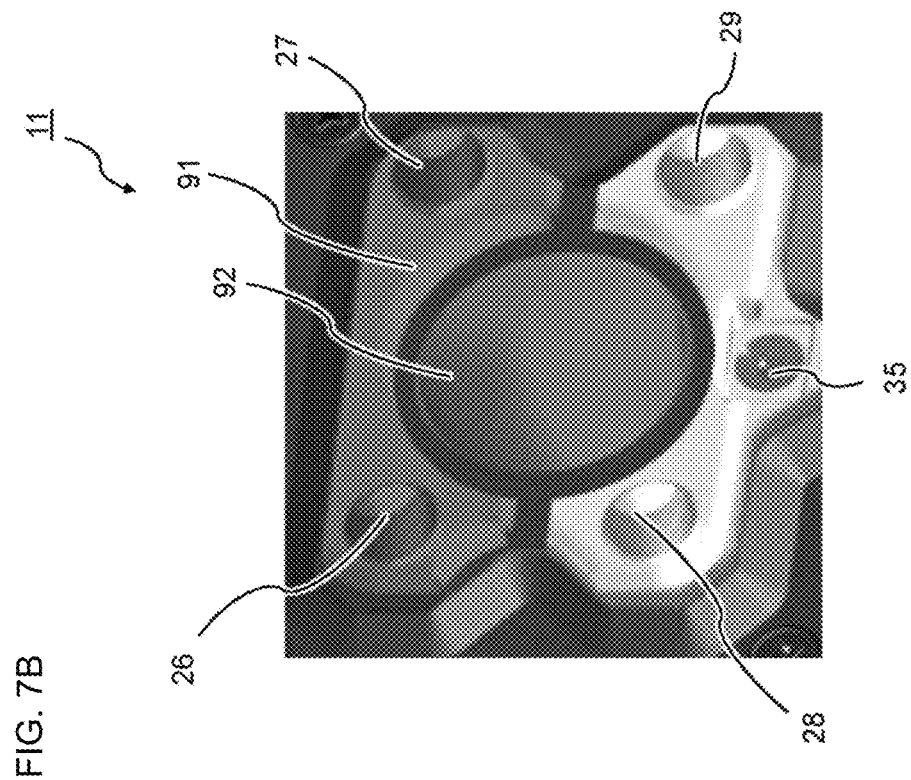
FIGS. 7A and 7B are diagrams showing one example of shapes of polarization filters.
Figure 7A:
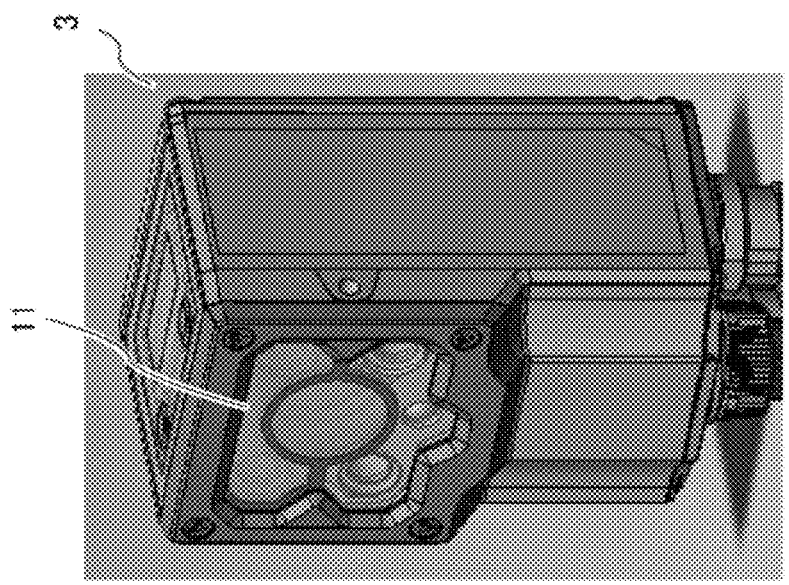

FIG. 7A is a perspective diagram of the reader 3, and FIG. 7B is an enlarged diagram of the window portion 11. In the window portion 11, a polarization filter 91 is provided in a portion where the light of the light emitter 26 is emitted (a light emission area), and a portion where the light of the light emitter 27 is emitted. Moreover, in the window portion 11, a polarization filter 92 is provided in a portion from which the light enters the optical system of the imaging element 31 (a light incidence area). A polarization direction of the polarization filter 91 and a polarization direction of the polarization filter 92 are different, and for example, different by 90 degrees. On the other hand, in the window portion 11, no polarization filter is provided in a portion where the light of the light emitter 28 is emitted, and a portion where the light of the light emitter 29 is emitted. In this manner, the light emitter 26 and the light emitter 27 may form the first illumination section, and the light emitter 28 and the light emitter 29 may form the second illumination section. That is, in place of performing the installation and the detachment of the polarization filter by the user, the reader 3 only needs to electrically switch between both the illumination sections. For example, for the workpiece to which the absence of the polarization filter is advantageous (e.g., a casting or the like), the second illumination section is lighted, and the first illumination section is put out. On the other hand, for the workpiece to which the presence of the polarization filter is advantageous (e.g., the workpiece having the two-dimensional code on a printed board, a milled surface, black resin or the like), the first illumination section is lighted, and the second illumination section is put out. This can largely reduce a load on the user, and enables the two-dimensional codes provided in the various workpieces to be accurately read with the single reader 3.

Figure 8A:
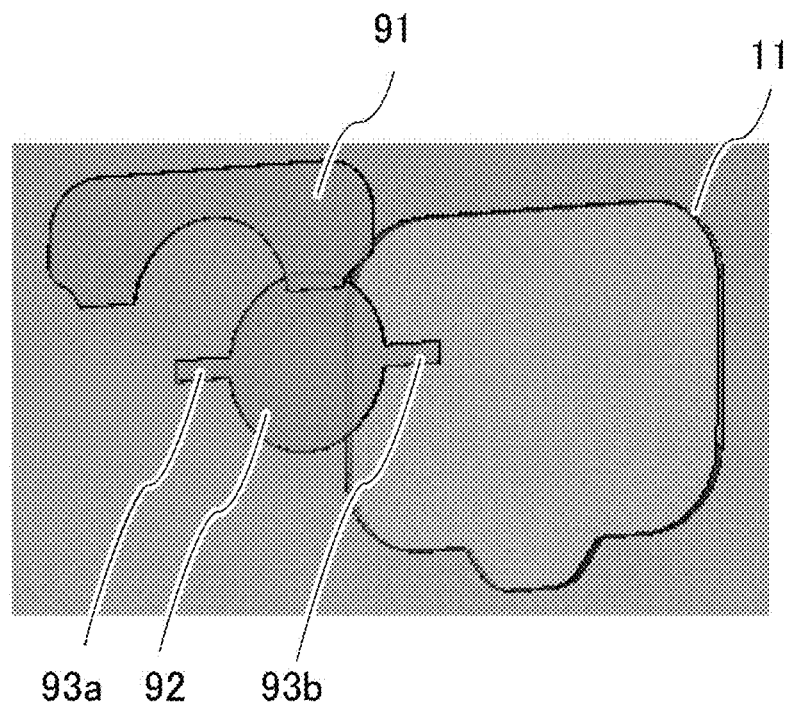
FIGS. 8A and 8B are diagrams showing the one example of the shapes of the polarization filters.

FIG. 8A shows one example of shapes of the polarization filter 91 and the polarization filter 92. In particular, the polarization filter 92 for the imaging element has a substantially circular shape, and alignment members 93a, 93b are provided at a left end and a right end of the polarization filter 92, respectively. A left end and a right end of a bottom portion of the polarization filter 91 match the shapes of the alignment members 93a, 93b, and are made linear in this example. A center of the bottom portion of the polarization filter 91 is substantially semicircular, and matches the shape of an upper portion of the polarization filter 92. In this manner, employing the alignment members 93a, 93b makes it easy to precisely paste the polarization filter 91 and the polarization filter 92 to the window portion 11. Moreover, the shape of a top portion of the polarization filter 91 matches the shape of a top portion of the window portion 11, which makes it easy to precisely align and paste the polarization filter 91 to the window portion 11.

<Switching Between Presence and Absence of Polarization Filter>

Figure 9:
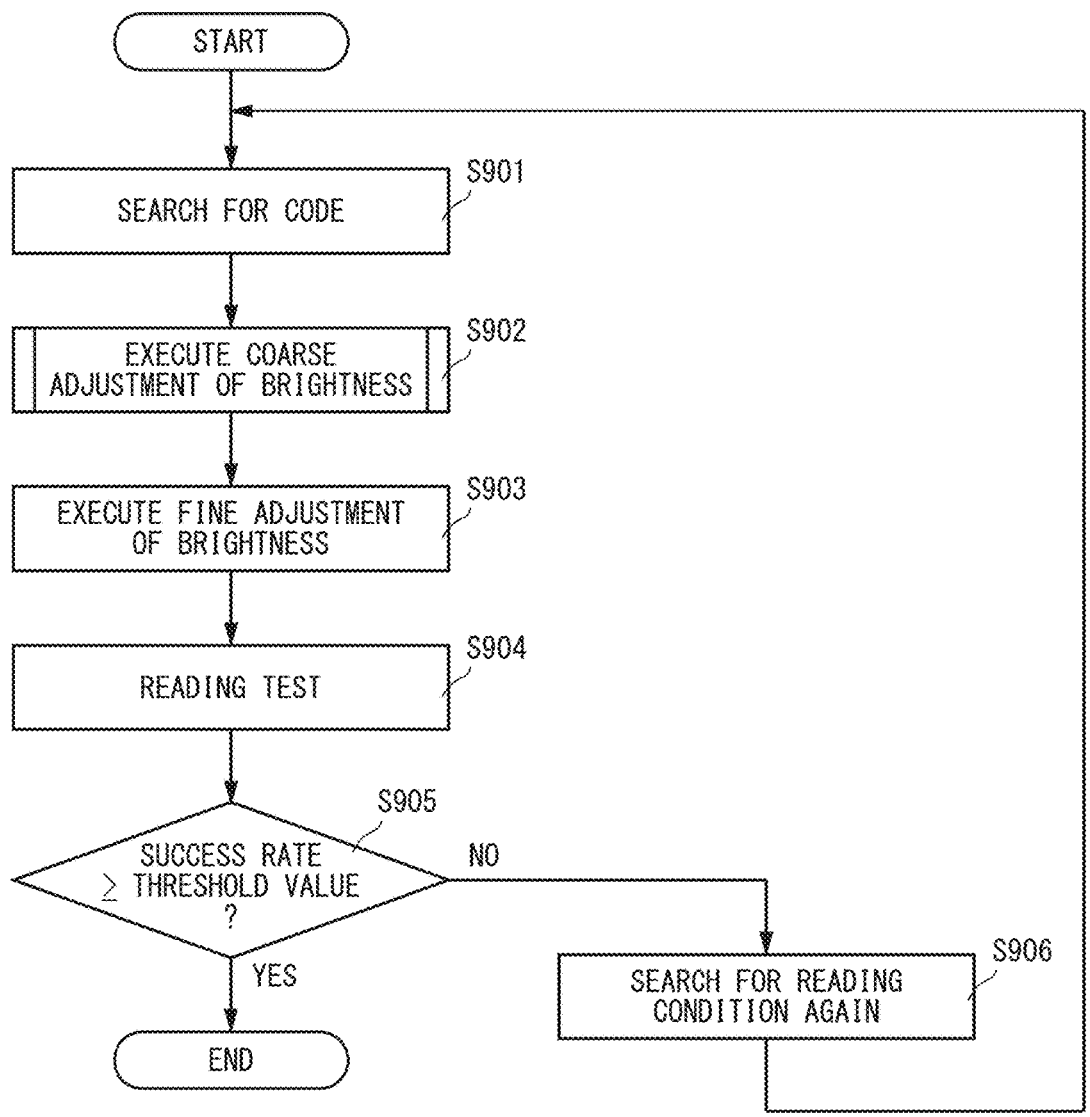
FIG. 9 is a flowchart showing tuning of a reading condition.
Figure 10:
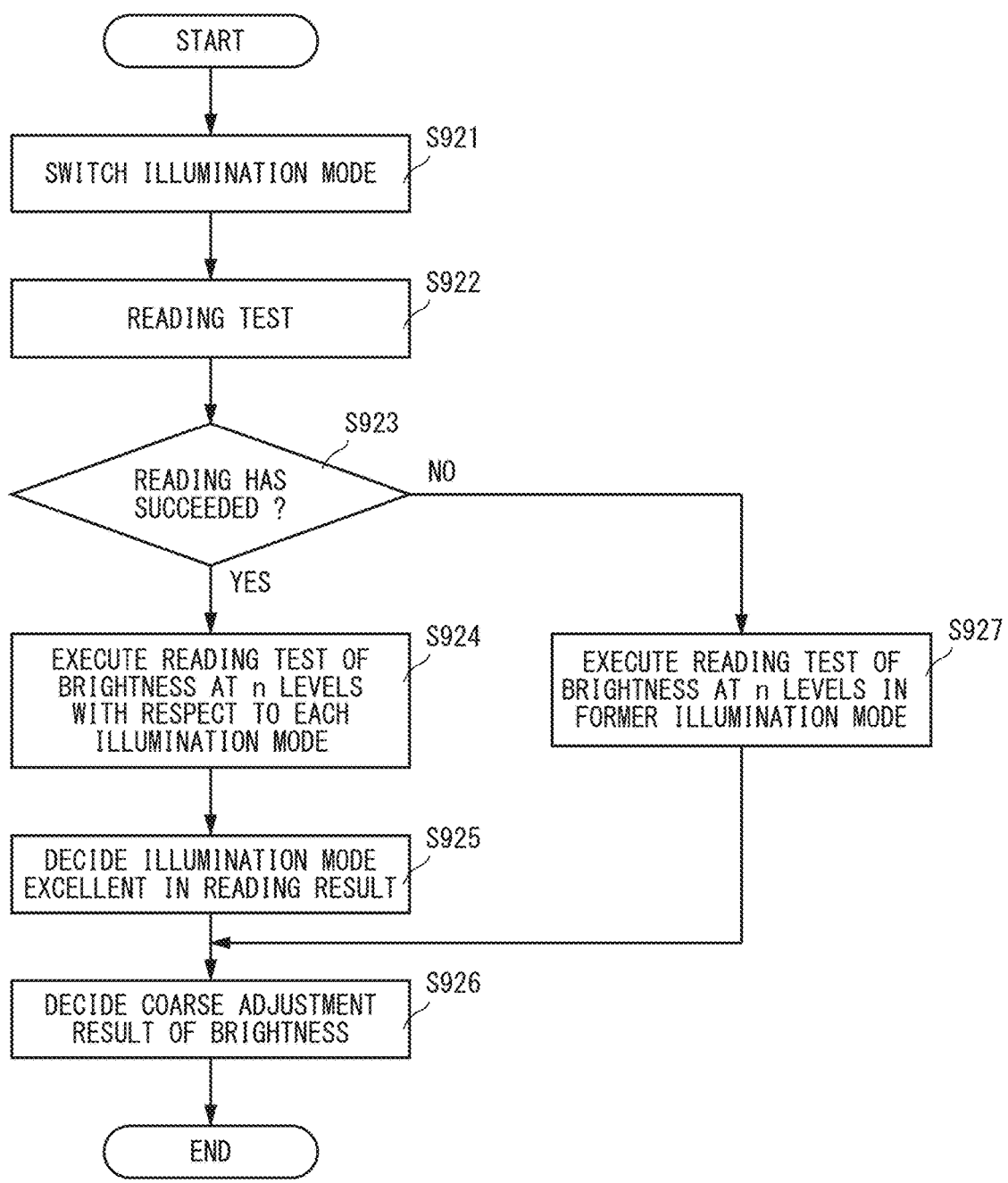
FIG. 10 is a flowchart showing coarse adjustment of a brightness level.

A switching method between a polarization mode and a non-polarization mode will be described with reference to FIGS. 9 and 10. FIG. 9 is a flowchart showing steps of tuning processing. When the input unit 56 or the computer 4 instructs to perform the tuning, the tuning unit 65 executes the following respective steps.

In S901, the tuning unit 65 executes code search. For example, the tuning unit 65 causes the imaging control unit 62 to execute imaging and acquire the image data, and causes the decoding unit 53 to search for the two-dimensional code, based on the image data. The imaging control unit 62 reads, from the setting data 73, the reading condition (the imaging condition of the imaging element 31, the illumination condition of the illumination unit 52, an image processing condition of the decoding unit 53, and the like) that is enabled at that point to set the same for the illumination unit 52, the imaging element 31, the decoding unit 53 and the like. The decoding unit 53 searches for the two-dimensional code from the image data 72 of the two-dimensional code acquired by the imaging element 31 to output a search result to the tuning unit 65. The illumination condition includes information indicating which of the polarization mode and the non-polarization mode is to be enabled.

In S902, the tuning unit 65 executes coarse adjustment of brightness of the illumination unit 52. FIG. 10 is a flowchart showing details of the coarse adjustment of the brightness in S902. In the present embodiment, the coarse adjustment of the brightness is executed, a more excellent reading result is selected between those in the polarization mode and in the non-polarization mode, and fine adjustment of the brightness is executed with respect to the selected illumination mode.

In S921, the tuning unit 65 switches to the illumination mode different from the illumination mode set in the illumination unit 52 at that point. That is, the tuning unit 65 switches to the non-polarization mode if the polarization mode is set in the illumination unit 52, and switches to the polarization mode if the non-polarization mode is set.

In S922, the tuning unit 65 executes a reading test. For example, the tuning unit 65 causes the imaging control unit 62 to execute the imaging, and causes the decoding unit 53 to execute the search for the two-dimensional code. In the reading condition enabled at that point, only the illumination mode is changed. The decoding unit 53 searches for the two-dimensional code with respect to the image data 72 of the two-dimensional code acquired by the imaging element 31 to output the search result to the tuning unit 65.

In S923, the tuning unit 65 determines whether or not the reading test has succeeded, based on the search result from the decoding unit 53. When the reading test is executed a plurality of times while changing the reading condition, it is determined whether or not the reading has succeeded even once. When the reading test succeeds, it means that the two-dimensional code can be decoded both in the polarization mode and in the non-polarization mode. Consequently, the processing proceeds to S924.

In S924, the tuning unit 65 executes the reading test for each of n (e.g., 27) brightness levels of N (e.g., 256) brightness levels with respect to each of the illumination modes. Thereby, the reading result with respect to each of the 27 brightness levels in the polarization mode can be obtained, and the reading result with respect to each of the 27 brightness levels in the non-polarization mode can be obtained. As shown in FIG. 11, the brightness levels as objects of the tuning may be different between in the polarization mode and the non-polarization mode. As described above, the brightness in the polarization mode is half of the brightness in the non-polarization mode. Consequently, as the brightness levels in the polarization mode, N/2 or more levels of the N levels may be assigned, and as the brightness levels in the non-polarization mode, levels less than N/2 of the N levels may be assigned. This can shorten time of the reading test to half, as compared with a case where all the N levels are comprehensively searched. Obviously, if time shortening is not requested, all the N levels may be comprehensively searched in each of the illumination modes.

In S925, the tuning unit 65 decides the illumination mode whose decoding result is favorable among the plurality of illumination modes. For example, the tuning unit 65 compares the numbers of successes in the reading test in the respective illumination modes to decide the illumination mode in which the reading has succeeded more. For example, if in the polarization mode, 27 reading tests have succeeded, and in the non-polarization mode, 10 reading tests have succeeded, the polarization mode is selected. When the number of successes of the polarization mode and the number of successes of the non-polarization mode are the same, or when a significant difference is not recognized, the tuning unit 65 may select the non-polarization mode. This is because when the same brightness is obtained, the non-polarization is more advantageous in power consumption and heat. However, in an environment where disturbance light or the like easily occurs, the reading success rate is higher in the polarization mode because the polarization filter can cut a part of the disturbance light. In the above-described case, thus, the polarization mode may be employed preferentially. While here, the numbers of successes in the reading test are compared, the tuning unit 65 may compare the reading success rates, or may calculate and compare the matching levels indicating the easiness of the reading.

In S926, the tuning unit 65 decides a coarse adjustment result of the brightness. For example, it is assumed that the brightness level can be changed from 0 to 255. In S924, the reading tests are executed for the n levels. The tuning unit 65 calculates a level (e.g., an average value), which is a center of m levels at which the reading has succeeded. In this manner, the coarse adjustment of the brightness is executed.

If in S923, the reading test has never succeeded in the other illumination mode, the tuning unit 65 omits or stops the search processing of the reading condition in the other illumination mode to select the former illumination mode, and the processing proceeds to S927. In S927, the tuning unit 65 executes the reading test for each of the n (e.g., 27) brightness levels with respect to the former illumination mode. Thereby, the reading result can be obtained for each of the 27 brightness levels with respect to the polarization mode or the non-polarization mode as the former illumination mode. Thereafter, the processing proceeds to S926 in which the tuning unit 65 calculates a level (e.g., an average value), which is a center of m levels at which the reading has succeeded.

When the coarse adjustment ends, the fine adjustment in S903 is executed. In S903, the tuning unit 65 varies the brightness around the brightness level decided by the coarse adjustment and searches for the brightness level at which the reading success rate or the matching level is highest to decide the level.

In S904, the tuning unit 65 executes the reading test again. In S905, the tuning unit 65 determines whether or not the reading success rate or the number of times of success exceeds a threshold value. If the reading success rate or the number of times of success exceeds the threshold value, the tuning unit 65 ends the tuning processing. On the other hand, if the reading success rate or the number of times of success does not exceed the threshold value, the processing proceeds to S906. In S906, the tuning unit 65 changes the reading condition other than the brightness (e.g., the exposure time, the gain, the coefficient of the image processing filter and the like), and returns the processing to S901.

CONCLUSION

In the present embodiment, as described in FIGS. 3B and 7A, the light emitters 26, 27 that irradiate the workpiece 2 with the illumination light through the polarization filter 91, and the light emitters 28, 29 that irradiate the workpiece 2 with the illumination light through no polarization filter are provided as illumination sections that illuminate the workpiece 2. In the imaging element 31, the polarization filter 92 having the polarization direction different from the polarization direction of the polarization filter 91 of the light emitters 26, 27 is provided. The imaging element 31 receives the light from the workpiece 2 illuminated by at least one of the light emitters 26, 27 and the light emitters 28, 29 through the polarization filter 92, and captures the image of the code provided in the workpiece 2. The decoding unit 53 decodes the image data acquired by the imaging element 31. In this manner, in the present embodiment, the light sources for polarization and light sources for non-polarization are included, so that either of them can be selected and lighted. In particular, the use of the polarization filters can cut the influence of the regular reflected light, so that the front attachment of the reader 3 is allowed. Thus, the installation load on the user can be reduced. Moreover, since the light sources for polarization and the light sources for non-polarization can be used properly in accordance with each of the workpieces 2, the reader 3 that can accurately read the code provided to the workpiece 2 is obtained. For example, the polarization mode in which only the light sources for polarization are lighted is advantageous to the workpiece 2 on which regular reflection easily occurs, such as a printed board. On the other hand, the non-polarization mode in which only the light sources for non-polarization are lighted is advantageous to the code on a casting provided by the direct marking. While in the present embodiment, a description has been given, focusing on the technique of selectively lighting the light sources for polarization and the light sources for non-polarization (lighting both non-simultaneously), the imaging control unit 62 may light both simultaneously, if the amount of light of only one of them is not sufficient.

As described with reference to FIGS. 9, 10 and the like, the tuning unit 65 may decide the illumination condition, based on which is more favorable, the decoding result of the decoding unit 53 acquired in a state where the light emitters 26, 27 for polarization are lighted and the light emitters 28, 29 for non-polarization are not lighted, or the decoding result of the decoding unit 53 acquired in a state where the light emitters 26, 27 for polarization are not lighted, and the light emitters 28, 29 for non-polarization are lighted. Which of the polarization mode and the non-polarization mode is more advantageous differs, depending on the workpiece 2. Thus, the reading test is actually executed to select the illumination mode that has brought about the more excellent result, which will increase the reading success rate. As the decoding result, the matching level as an index indicating the easiness of the reading of the code, or the number of times of the success in decoding of the code or the like may be employed. In each of the reading results, there are only two results of success and failure, so that superiority or inferiority cannot be determined. Consequently, the matching level or the number of times of success obtained by executing the reading a plurality of times is set as a criterion of the determination, by which the illumination mode advantageous to each of the workpieces can be easily decided.

There is a case where no significant different exists between the decoding result in the polarization mode and the decoding result in the non-polarization mode. In this case, the polarization mode may be employed. Since the disturbance light is reduced by the polarization filter in the polarization mode, the polarization mode may be more advantageous in a factory where there is much disturbance light, or the like.

Moreover, when the decoding succeeds in both the polarization mode and the non-polarization mode, the non-polarization mode may be employed. Employing the non-polarization mode has advantages of being able to cut power consumption in the light emitters, and cut the amount of heat radiation. In particular, in an environment of less disturbance light, the power consumption or the like may be emphasized. In this case, thus, the non-polarization mode is desirably employed.

As described above, the tuning unit 65 controls the reading condition including the imaging condition of the imaging element 31 and the image processing condition in the decoding unit 53. The tuning unit 65 may start the search for the reading condition after the illumination condition has been decided. That is, after the non-polarization mode or the polarization mode is first decided, the adjustment may be made so that the exposure time, the gain, the coefficient of the image processing filter and the like as the reading condition become more proper. The processing for deciding the reading condition is likely to require more enormous work than the processing for deciding the illumination mode. For example, the amount of work will be very large if the adjustment processing of the reading condition is executed for each of the illumination modes. Consequently, the illumination mode is decided, and then, the adjustment processing of the reading condition is executed, which can largely cut the amount of work as a whole.

As described with reference to FIGS. 9, 10 and the like, the tuning unit 65 may execute the coarse adjustment of the brightness parameter in the reading condition with respect to each of the polarization mode in which the light emitters 26, 27 are lighted and the light emitters 28, 29 are not lighted, and the non-polarization mode in which the light emitters 26, 27 are not lighted and the light emitters 28, 29 are lighted to thereby determine in which of the polarization mode and the non-polarization mode the decoding has succeeded more, and may further execute the fine adjustment of the brightness parameter with respect to the mode in which the decoding has succeeded more between the polarization mode and the non-polarization mode. This enables the illumination mode and the brightness parameter to be efficiently decided.

In the coarse adjustment, the tuning unit 65 may execute code search processing of searching for the code from the image data in one mode of the polarization mode and the non-polarization mode. When the code is found by the code search processing, the tuning unit 65 may switch to the other mode of the polarization mode and the non-polarization mode to execute the code search processing again. When the code is not found in the other mode, the tuning unit 65 may stop the adjustment of the reading condition in the other mode to execute the adjustment of the reading condition in the one mode. In this manner, when there is less possibility of reading the code properly in the other mode, the adjustment in the other mode is omitted, which can largely shorten the time required for the coarse adjustment.

As described with reference to FIG. 11, a search range of the brightness parameter may differ between in the polarization mode and in the non-polarization mode. There is a character that the brightness is different just by a factor of two between in the polarization mode and in the non-polarization mode. Thus, a start level of the search range of the polarization mode may be set to be twice as high as a start level of the search range of the non-polarization mode. Similarly, an end level of the search range of the polarization mode may be twice as high as an end level of the search range of the non-polarization mode. This can cut the search time to about half, as compared with the case where the brightness level is comprehensively searched for in each of the illumination modes.

As described with reference to FIGS. 2A and 2B, the connector holder 20 functions as a connection section that connects the communication cable to output the decoding result to outside. The light emitters 26, 27 may be arranged farther with respect to a light receiving portion of the imaging element 31 when seen from the connector holder 20, and the light emitters 28, 29 may be arranged nearer with respect to the light receiving portion of the imaging element 31 when seen from the connector holder 20.

As described with reference to FIG. 2B, the window portion 11 is arranged as a light transmitting plate in the housing on the light emission side of the illumination light of the light emitters 26, 27 and the light emitters 28, 29. Moreover, as described with reference to FIGS. 7A, 8A and 8B, the polarization filter 91 is attached to the area, which is a part of the window portion 11, where the light from the light emitters 26, 27 is transmitted. Moreover, the incidence area of the light to the imaging element 31 may be provided in an almost center of the light transmitting plate, which is the window portion 11, and, the emission area of the light of the light sources for polarization and the emission area of the light from the light sources for non-polarization may be arranged around the incidence area. Moreover, the number of light emitters constituting the light sources for polarization and the number of light emitters constituting the light sources for non-polarization may not be coincident. This is because the light emitters can be arranged around an optical axis of the imaging element 31 with good balance. Since when the polarization filter 91 is attached, the amount of light becomes half, the number of light emitters constituting the light sources for polarization may be twice as large as the number of light emitters constituting the light sources for non-polarization. This can almost equalize the amount of light of respective light sources.

As described above, the polarization direction of the polarization filter of the light emitters 26, 27, and the polarization direction of the polarization filter of the imaging element 31 are different by 90 degrees. This is efficient in efficiently attenuating the regular reflected light. The angle need not be absolutely 90 degrees, but a slight allowance is naturally permitted.

Figure 8B:
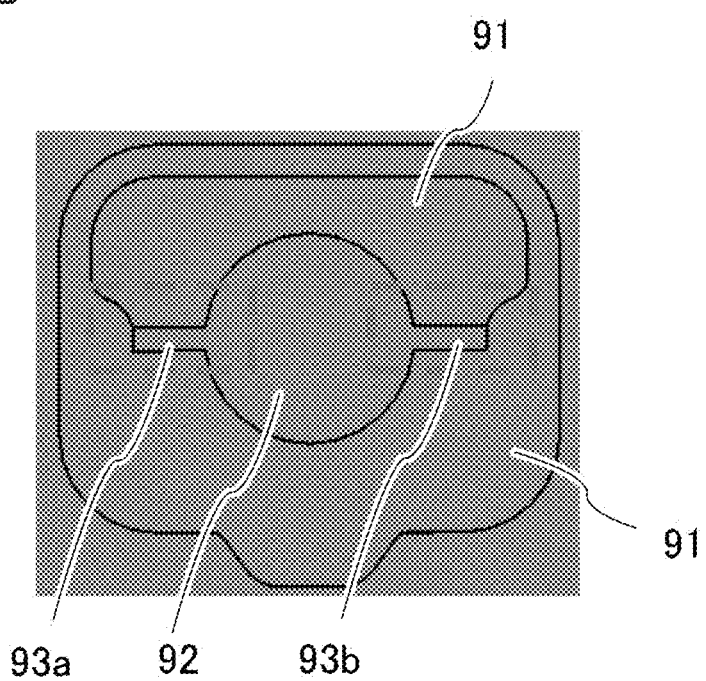

As described with reference to FIGS. 8A and 8B, the shape of the polarization filter 92 of the imaging element 31 is substantially circular. While the shape of the polarization filter 92 can be rectangular, the shape of the polarization filter 92 is made circular because the shape of a lens of the optical system is circular, which will make downsizing of the reader 3 easy. The alignment members 93a, 93b may extend at the left end and the right end of the polarization filter 92, respectively. This makes the alignment easier when the polarization filter 92 is pasted to the window portion 11. The shape of the polarization filter 92 including the alignment members 93a, 93b may be bilaterally symmetrical. The polarization filter may not be provided in a light emission area of the light emitter 35 for the pointer. This is because a higher intensity of reflected light from the light emitter 35 for the pointer is preferable.

The tuning unit 65 may select either of the polarization mode and the non-polarization mode in accordance with the setting information received from the control device provided outside the reader 3, such as in the computer 4, the PLC 5 or the like. In this manner, the illumination mode may be forcibly set and fixed from the computer 4 and the PLC 5. This enables the illumination mode to be fixed to the mode in accordance with the user's convenience.

A description has been given on the assumption that the plurality of light emitters 26, 27 making up the first illumination section are lined up along a conveyance direction of the two-dimensional code, and the plurality of light emitters 28, 29 making up the second illumination section are also lined up along the conveyance direction. However, the combinations of the first illumination section and the second illumination section may be changed. For example, the first illumination section may be made up of the light emitters 28, 29, and the second illumination section may be made up of the light emitters 26, 27. Similarly, the first illumination section may be made up of the light emitters 26, 28, and the second illumination section may be made up of the light emitters 27, 29. Similarly, the first illumination section may be made up of the light emitters 27, 29, and the second illumination section may be made up of the light emitters 26, 28. The first illumination section may be made up of the light emitters 26, 29, and the second illumination section may be made up of the light emitters 27, 28. Furthermore, the first illumination section may be made up of the light emitters 27, 28, and the second illumination section may be made up of the light emitters 26, 29.

Since the first illumination section is provided with the polarization filter, the amount of light is smaller, as compared with the second illumination section. Consequently, the number of light emitters making up the first illumination section may be larger than the number of light emitters making up the second illumination section. Similarly, the light emitters in each of which a maximum amount of light is larger may be employed as the light emitters making up the first illumination section, and the light emitters in each of which the maximum amount of light is smaller may be employed as the light emitters making up the second illumination section. This enables the decrease in the amount of light by the polarization filter to be compensated for.

While a description has been given on the assumption that the polarization filters 91, 92 are stuck to the window portion 11, these filters may be detachable polarization filters.

As to the reading condition as an object of the tuning, a plurality of combinations (banks) may be prepared in advance. The tuning unit 65 may switch the banks and execute the reading test to thereby decide the proper bank for each of the workpieces. Each bank includes the setting information indicating which of the polarization mode and the non-polarization mode is to be employed.

As described with reference to FIG. 2B and the like, for at least one of the optical system of the imaging element 31, the first illumination section and the second illumination section, the reflector 17, which is a light condensing member, may be employed. The light condensing member of the reflector 17 for the imaging element may be a light condensing member having a circular shape in a cross section parallel to the imaging surface of the imaging element 31. That is, a cone type or a truncated cone type light condensing member may be employed. Similar light condensing members may be employed for the light emitters 26 to 29. In particular, since the employment of the polarization filter decreases the amount of light, the light condensing member may compensate for the decrease in the amount of light.

What is claimed is:
1. A fixed code reading device for reading a code on a workpiece, comprising:
  a housing;
  a window portion provided on a front surface side of the housing and having translucency;
  a first light source provided in the housing and configured to output light;
  a first polarization filter provided in the first region of the window portion and light output from the first light source passing through the first region of the window portion;
  a second light source provided in the housing and configured to output light to an outside of the housing through a second region of the window portion which is a different region from the first region of the window portion and in the absence of any polarization filter;
  a second polarization filter provided in a third region of the window portion which is a different region from the first region and the second region of the window portion, and a polarization direction of the second polarization filter being different from a polarization direction of the first polarization filter;

a storage unit configured to store setting data including an illumination condition information which indicates which of a polarization mode in which light from the first light source is output through the first polarization filter and a non-polarization mode in which light is output from the second light source through the second region of the window is to be enabled;

an imaging control unit configured to select the polarization mode in which the first light source for polarization is lighted or a non-polarization mode in which the second light source for non-polarization is lighted in accordance with the illumination condition information stored in the storage unit;

an imaging section configured to receive light output from the first light source if the polarization mode is set and light output from the second light source if the non-polarization mode is set, reflected at the workpiece and through the second polarization filter, and configured to output image data of the code on the workpiece; and a decoding section that decodes the image data acquired by the imaging section.

2. The fixed optical information reading device according to claim 1, further comprising:

a reading condition control section that controls a reading condition including an imaging condition of the imaging section and an image processing condition in the decoding section, wherein the reading condition control section starts search for the reading condition after the illumination condition is decided.

3. The fixed code reading device according to claim 1, wherein the second polarization filter includes an alignment shape for aligning the second polarization filter to the third region of the window portion.

4. The fixed code reading device according to claim 1, wherein the shape of the end portion of the second polarization filter is bilaterally symmetrical.

5. The fixed code reading device according to claim 1, wherein the shape of the end portion of the second polarization filter includes a line and a circular arc.

6. The fixed code reading device according to claim 1, wherein the shape of the end portion of the second polarization filter includes a first line, a second line and a circular arc between the first line and a second line.

7. The fixed code reading device according to claim 1, wherein a shape of the first polarization filter other than the part of the end portion of the first polarization filter matches an end portion of a shape of the window portion.

8. The fixed code reading device according to claim 1, further comprising, a third light source configured to output an pointer showing an imaging region of the imaging section, and wherein the third light source is provided such that light of the pointer is passed through a fourth region of the window portion, the fourth region is where the first polarization filter and the second polarization filter are not provided.

9. The fixed code reading device according to claim 8, further comprising, a substrate including the first light source, the second light source and the third light source thereon and being parallel to the window portion.

* * * * *